M. G. MITCHELL.
STREET SWEEPING MACHINE.
APPLICATION FILED NOV. 28, 1910.
1,179,548.
Patented Apr. 18, 1916.
3 SHEETS—SHEET 1.
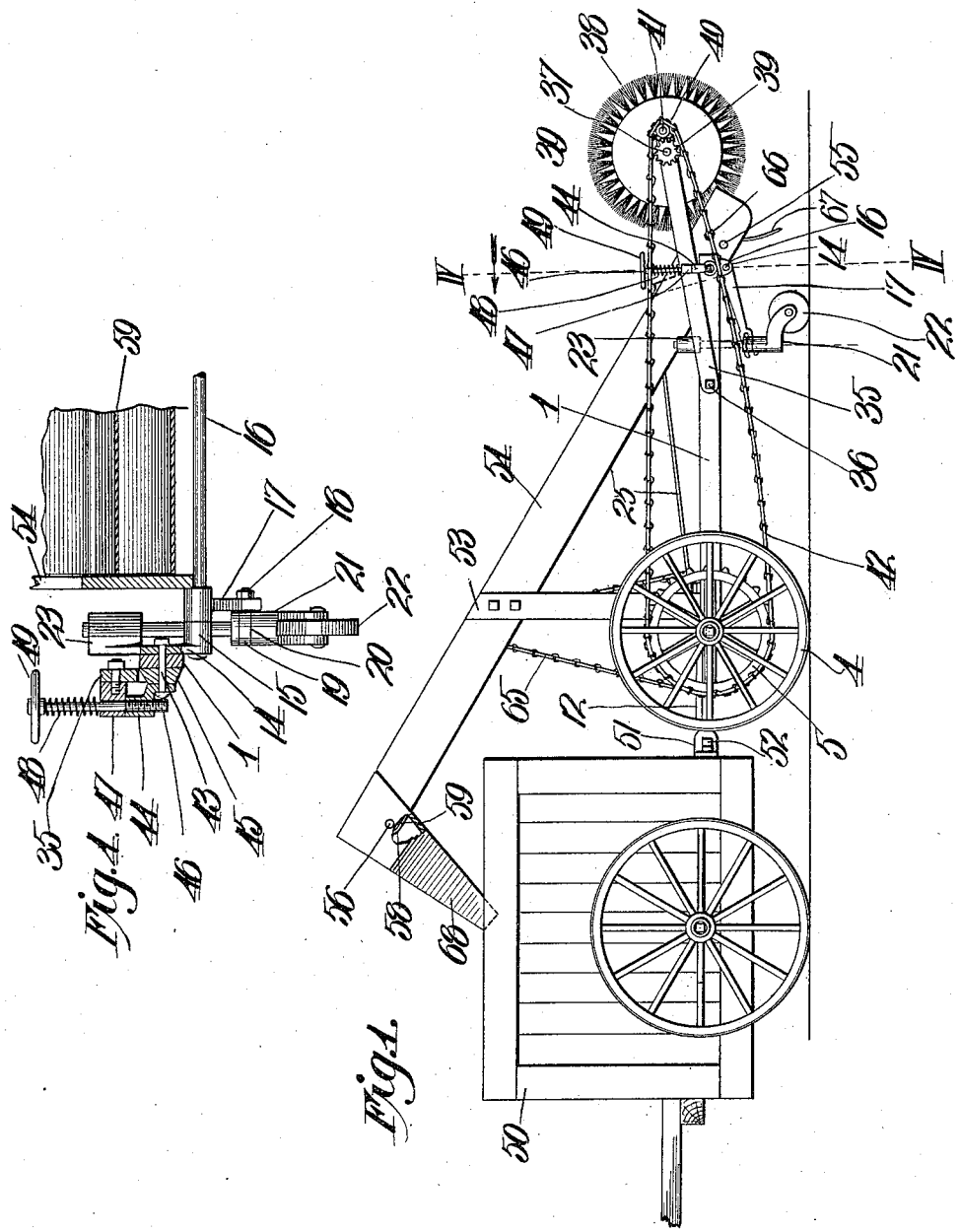
Witnesses
Frank R Hon
H.C. Rodgers.
Inventor
M.G. Mitchell
By George H Thorpe Atty.

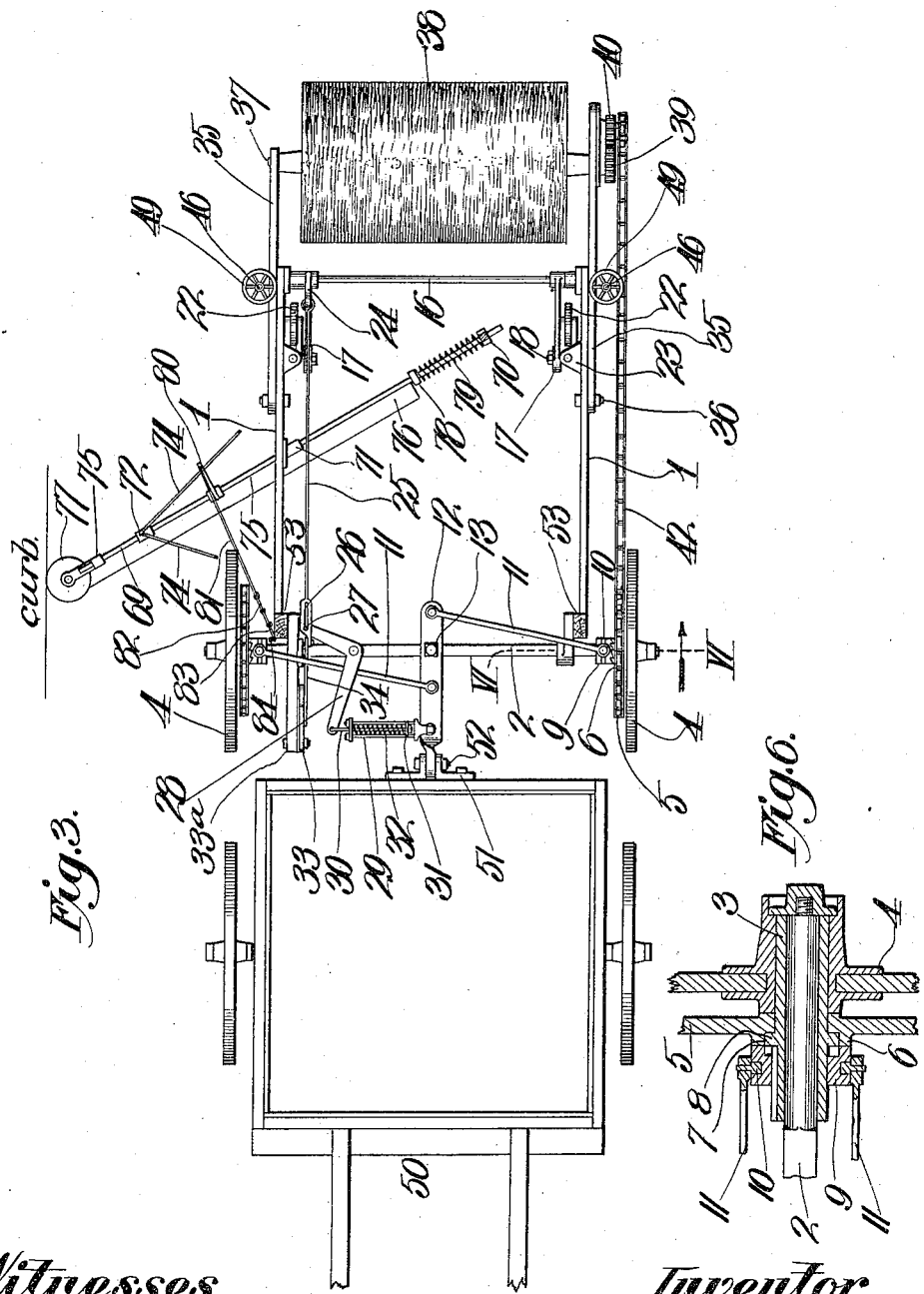

M. G. MITCHELL.
STREET SWEEPING MACHINE.
APPLICATION FILED NOV. 28, 1910.
1,179,548.
Patented Apr. 18, 1916.
3 SHEETS—SHEET 3.
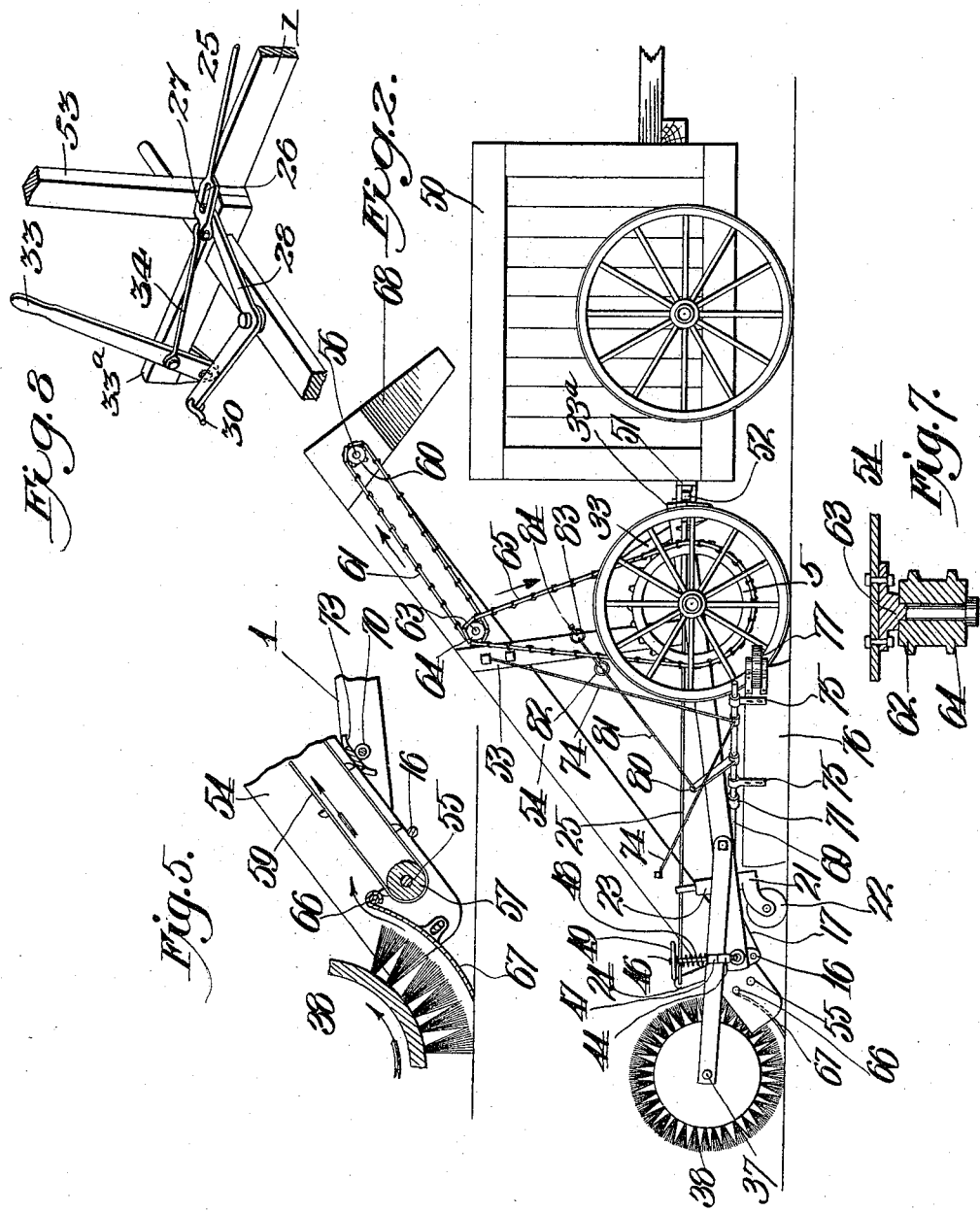
Witnesses
Frank P. Elon
N. C. Rodgers.
Inventor
M. G. Mitchell
By George H. Thorpe Atty.

UNITED STATES PATENT OFFICE.

MILLARD G. MITCHELL, OF KANSAS CITY, KANSAS.

STREET-SWEEPING MACHINE.

1,179,548.   Specification of Letters Patent.   Patented Apr. 18, 1916.

Application filed November 28, 1910. Serial No. 594,544.

*To all whom it may concern:*

Be it known that I, MILLARD G. MITCHELL, a citizen of the United States, residing at Kansas City, in the county of Wyandotte and State of Kansas, have invented certain new and useful Improvements in Street-Sweeping Machines, of which the following is a specification.

This invention relates to street sweeping machines and my object is to produce a machine of this character which will perform its function efficiently and is of comparatively simple and inexpensive construction.

A further object is to produce a machine of this character embodying means for reliably elevating the sweepings from the street and depositing them within a cart or analogous device detachably connected to the machine.

A still further object is to produce a machine by which the street can be reliably swept close to the curb and which is of light weight and compact construction so as to be conveniently drawn along by the same animal employed with the cart.

With these and other objects in view the invention consists in certain novel and peculiar features of construction and organization as hereinafter described and claimed; and in order that it may be fully understood reference is to be had to the accompanying drawings, in which—

Figure 1, is a side view of a street sweeping machine embodying my invention, with the brush elevated to inoperative position. Fig. 2, is a view of the opposite side of the machine with the brush depressed to operative position. Fig. 3, is a plan view with the sweepings elevating mechanism omitted. Fig. 4, is an enlarged section on the line IV—IV of Fig. 1. Fig. 5, is a vertical section showing a part of the sweeping roller, the adjacent or lower end of the elevating mechanism, and the elevating plate over which the sweepings must travel to reach the elevator. Fig. 6, is a vertical section on the line VI—VI of Fig. 3. Fig. 7 is a sectional view showing a pair of sprocket wheels for transmitting motion from one chain to another. Fig. 8, is a detail perspective view illustrating more clearly the arrangement and connection of a lever forming part of the machine.

In the said drawings, 1 indicates a pair of side bars, connected at their front ends by a cross bar 2, constituting an axle. Journaled on the ends of the axle are sleeves 3 and keyed or otherwise rigidly secured on the outer ends of said sleeves are carrying wheels 4. Journaled on said sleeves at the inner sides of wheels 4 are sprocket wheels 5 formed with clutch members 6 at their inner sides and with recesses 7 receiving flanges 8 rigid with sleeves 3, and adapted to prevent the sprocket wheels sliding inward on the sleeves.

9 are clutch members mounted to slide upon and rotate with the sleeves and equipped with the customary journaled rings 10 for engagement by the outer or forked ends of links 11 pivoted at their inner ends to a pivoted draw bar 12, pivoted at 13 midway between said links to the axle, the arrangement being such that the turning movement of the draw bar to the left side will incidentally effect the disengagement of the sliding clutch members 9 from clutch member 6, and thus permit the sprocket wheels 5 to remain at rest without being affected by the rotation of the carrying wheels and sleeves. It will also be understood that immediately the draw bar is swung back to normal position, that is, parallel with the side bars, the slidable clutches are caused to reëngage clutch member 6 and start the rotation of the sprocket wheels.

At opposite points, a short distance from the rear ends of side bars 1 is a pair of depending brackets 14, having their bearing ends widened at 15, and receiving the opposite ends of a cross rod 16, and rigid on said rod is a pair of forwardly projecting forked levers 17 pivotally engaging pins 18 projecting inwardly from collars 19, fitting in grooves 20 in the lower or large ends of the vertical rods 21 equipped at their lower ends with casters 22 and fitting slidingly and rotatably in lugs 23, carried by side bars 1 in advance of brackets 14. Movable and preferably formed integral with one of said levers 17, is a lever or arm 24 connected pivotally to the rear end of a pull rod 25 having a longitudinal slot 26 at its front end engaging a pin 27 of a bell crank 28 mounted for movement in a horizontal plane on axle 2, the opposite end of said bell crank being held with a yielding pressure toward the draw bar by a device consisting of a sleeve 29, pivoted to the draw bar, a rod 30 pivoted to the bell crank and slidingly engaging the sleeve 29 and provided with a head 31 at its opposite end, and the spring 32 interposed between the free end of the sleeve and the head 31 and fitting on the rod 30.

For the purpose of raising the rear end of the frame by operating pull rod 25 without affecting the position of the bell crank 28 and hence independently of movement by the draw bar, I mount a hand lever 33 on a part 33ª rigid with the frame constituted by the side bars, the axle, and the cross rod 16, and connect said lever by a link 34 to the pull rod, suitable pawl and ratchet mechanism, not shown, being employed to secure the lever 33 at the desired point of adjustment, it being understood that when said lever is thrown forward it has the same effect on the rear end of the frame as the movement of the draw bar to the left, which movement as will be readily understood imparts a forward pull on the pull rod 25 and causes the arms 17 to fulcrum on the inwardly projecting pins of collars 19, and thus raise the rear end of the frame, reverse movement of the pull rod permitting the rear end of the frame to swing downward from the position shown in Fig. 1, to the position shown in Fig. 2, the former being the inoperative and the latter the operative position of the machine.

35 is a pair of swing bars pivoted at 36 to and projecting rearwardly beyond the side bars 1 and journaled in the rear ends of bars 35 is a shaft 37 upon which is secured a rotary brush 8 and a gear wheel 39 meshing with an idler gear 40, carried by the adjacent bar 35, and cast integral with a sprocket wheel 41 connected by a chain 42 to sprocket wheel 5 at the same side of the machine, the gear 40 being preferably smaller than gear 39 so that the speed of the rotary brush shall not be too great.

Secured pivotally to the outer sides of the side rails, on one of the bolts 43 employed to secure brackets 14 in place, are threaded sleeves 44, spacing washers 45 being employed to space said sleeves out of the vertical plane of the bars 35 to receive the lower threaded ends of the vertical bolts 46 journaled in sleeves 47 projecting outward from bars 35. When the last-named bars and hence the brush occupy the most depressed positions, sleeves 47 rest upon sleeves 44 and are held pressed yieldingly downward by the springs 48 encircling rods 46, and bearing at their lower ends on the sleeves 47 and at their upper ends against the hand wheels 49 at the upper ends of the rods. In this connection it will be seen that Fig. 4, illustrates the swing bars 35 at their downward limit of swinging movement because the sleeves 47 are in engagement with the upper ends of the sleeves 44, and it will also be noticed that by turning the hand wheels 49 backward so as to impart unscrewing movement to the rods, the upper ends of the threaded portions of the same press upwardly on sleeves 47 because the threaded portions of the rods 46 are of greater diameter than the bores or passages of the sleeves.

It will be understood that the springs 48 hold the rotary brush-carrying arms yieldingly depressed but leave the brush free to easily ride over irregularities in the surface of the pavement being swept. If it is desired to hold the brush with more or less pressure upon the pavement, the hand wheels are turned in one direction or the other to impose more or less pressure upon the sleeves 47 carried by the swing bars 35.

As a convenient and economical means for effectively operating the machine, an ordinary wheeled cart 50 is provided with a bifurcated bracket 51 at its rear end receiving the front end of draw bar 12, a horizontal pivotal pin 52 securing the draw-bar to the bracket so as to allow of a slight up and down movement of the cart or the sweeper independently of each other and yet compel the draw bar to rock to one side should the cart be turned to the left, it being noticed that the parts are so arranged and constructed that it will be impossible for the cart to turn to the right and impart pivotal movement to the draw bar, as the slidable clutches are at their outward limits of movement when the draw bar is at right angles to the axle.

Erected upon the side bars 1, are standards 53 and secured upon said standards is an inclined elevator constructed as follows: 54 are side bars resting at their lower ends on cross rod 16. 55 and 56 are parallel shafts extending through the side bars 54 and equipped respectively with rollers 57 and 58 connected by an endless carrier 59, said carrier extending almost the full length of bars 54, and to impart motion to said carrier one end of the shaft 56 is equipped with a sprocket wheel 60 connected by a sprocket chain 61 to a sprocket wheel 62, journaled on a stub shaft 63 secured to the adjacent side bar 54, and said sprocket wheel 62 is case integral with a sprocket wheel 64 connected by a sprocket chain 65 with the sprocket 5 not geared to the rotary brush so that as the machine is drawn forward motion is imparted to chains 65 and 61 in the direction indicated by the arrows Fig. 2. the endless carrier 59 obviously traveling in the same direction, as indicated by the arrow, Fig. 5.

At the lower end of the carrier frame a cross rod 66 connects the side bars 54 above the lower end of the carrier and hinged upon said rod is a curved plate or pan 67, which corresponds approximately in curvature to and is arranged to drag upon the pavement under the forward portion of the brush so that as the latter is turned in the direction indicated by the arrow, Fig. 5, it forces the scrapings up over said plate or pan and onto the carrier which conveys said scrapings upward and eventually deposits them through the downwardly and forwardly inclined spout 68 into the cart 50.

For cleaning the pavement close to the curb, outward of the plane of the adjacent wheels, I provide the following construction: 69 is a horizontal rod extending outwardly and forwardly beyond the right hand side of the machine from a point below the rear end of the elevator, and said rod extends slidingly through bearings 70 and 71 and 72, bearing 70 being rigid with a cross bar 73 connecting side bars 1. Bearing 71 is carried by one of the side bars 1 and bearing 72 is connected by braces 74 to the elevator frame and the adjacent side bar 1 or it is otherwise suitably braced, the bearing 72 and bracing being to guard against any backward spring movement of the rod 69. 75 are hangers rigid with and depending from rod 69, and secured rigidly to said hangers is a blade 76 disposed at the same angle as rod 69 and adapted to scrape the ground in the forward progress of the machine and cause the substance scraped to moved inwardly to a point below the longitudinal center of the machine where it can be swept up by the rotary brush 38. At its outer extremity the blade is equipped with a horizontally-arranged anti-friction roller 77 for engagement with the curb, see Fig. 3, if the machine is driven sufficiently close thereto, and to avoid injury to the rod and scraper blade in the event of forcible impact of the roller with the curb, the rod is provided with a collar 78, sustaining the outward pressure of a stiff coil spring 79, mounted on the rod and bearing at its opposite end against the bearing 70. This spring will yield under an overcoming pressure applied endwise on the rod and scraper through the roller and when said pressure is relaxed the spring will restore the rod and scraper to their original positions. When making a turn or in driving to and from the street where the machine is to perform its function, the blade should be out of contact with the ground and to accomplish this, the rod 69 which is rigid with the blade is provided with an arm or lever 80, and attached thereto and at its rear end is a cable 81, provided with a loop 82 and a loop 83, either of which is adapted to engage a hook 84 on the adjacent standard 53. When the blade is in operative position as shown in Fig. 2, loop 83 engages the hook. When the blade is in inoperative position that is, is raised, the loop 82 is in engagement with the hook, a forward pull on the cable swinging the blade upwardly and rearwardly as will be readily understood.

Assuming that the parts are as shown in Fig. 2, it will be seen that as the machine is drawn along a roadway, the rotary brush 38 will gather the sweepings and force them over the plate or pan 67 onto conveyer 59 and that they will be eventually delivered into the cart 50. If it is desired to cross a car track without sweeping the same, the person in control can operate the hand lever 33 and raise the rear end of the frame and the brush out of contact with the ground, it being noticed that this operation of said lever imparts a forward pull on rod 25 and causes arm 17 to fulcrum on pins 19, so that the bearings 23 carried by the rear end of the frame shall slide upward on the stems of the casters which sustain the rear end of the frame, it being also noticed that because of the pin and slot connection between the pull rod 25 and bell crank 28, the latter is not affected by the movement of said pull rod.

When the machine turns to the left and therefore causes corresponding pivotal movement of the draw bar 12, the pull rod is drawn forward to effect the raising of the brush from the ground in a manner hereinbefore explained, this action being due to the fact that the bell crank 28 engages the pull rod and is thus linked to the draw bar. At the same time the links 11 connecting the draw bar with the clutch members 9 withdraw the latter from engagement with the companion clutch members 6, so that the rotation of the carrying wheels 4 during the turning movement of the machine will not impart rotation to the rotary brush and the conveyer as said parts perform no function during the turning movement. It will also be understood that when the machine is being turned, the operator by means of the cable 81 will raise the scraping blade 76 from the ground and secure the same in such position by causing the engagement of loop 82 with the hook 84.

From the above description it will be apparent that I have produced a street sweeping machine embodying the features of advantage enumerated as desirable in the statement of the object of the invention and I wish it to be understood that I do not desire to be restricted to the exact details of construction shown and described as obvious modifications will suggest themselves to one skilled in the art.

I claim:

1. A street cleaning vehicle, comprising a wheeled support, a frame vertically tiltable thereon, a frame pivotally carried by and at the rear end of the tiltable frame, a device for engaging and cleaning the street, carried at the rear end of the pivotally carried frame, a longitudinally extending draw-bar mounted on the tiltable frame, and connections between said draw-bar and the pivotally carried frame whereby pivotal movement of the draw-bar to the right or left from its normal position shall operate the pivotally carried frame to raise the street engaging device to inoperative position.

2. A street cleaning vehicle, comprising a wheeled support, a vertically tiltable frame mounted thereon, a frame pivotally carried by and at the rear end of the tiltable frame, a rotary brush journaled on said pivotally carried frame, means for driving said brush from one of the vehicle wheels, a longitudinally extending draw-bar mounted on the tiltable frame, connections between said draw-bar and the pivotally carried frame whereby pivotal movement of the draw-bar to the right or left of its normal position shall operate the pivotally carried frame to raise the brush to inoperative position, and means actuated by the draw bar in its pivotal movement to the right or left from its normal position, for throwing the said driving means to inoperative position.

3. A street cleaning vehicle, comprising a wheeled support, a vertically tiltable frame mounted thereon, a frame pivotally carried by and at the rear end of the tiltable frame, a device for engaging and cleaning the street, carried at the rear end of the pivotally carried frame, a longitudinally extending draw-bar mounted on the tiltable frame, connections between said draw-bar and the pivotally carried frame whereby pivotal movement of the draw-bar to the right or left from its normal position shall operate the pivotally carried frame to raise the said device to inoperative position, and means whereby the pivotally carried frame may be operated independently of said draw-bar and connections.

4. A street cleaning vehicle, comprising a wheeled support, a rotary brush carried by said support, an endless conveyer to receive and carry the sweepings from said brush, means operated from the vehicle wheels for driving the brush and conveyer, a longitudinally extending draw-bar mounted on the wheeled support, connections between the draw-bear and the rotary brush whereby pivotal movement of the former to the right or left from its normal position shall raise the brush to inoperative position, and means actuated by the draw bar in its pivotal movement to the right or left from its normal position, for throwing the said driving means to inoperative position.

5. A street cleaning vehicle, comprising a wheeled support, a rotary brush carried by said support, an endless conveyer to receive and carry the sweepings from said brush, means operated from the vehicle wheels for driving the brush and conveyer, a longitudinally extending draw-bar mounted on the wheeled support, connections between the draw-bar and the rotary brush whereby pivotal movement of the former to the right or left from its normal position shall raise the brush to inoperative position, means actuated by the draw bar in its pivotal movement to the right or left from its normal position, for throwing the said driving means to inoperative position, and means for exerting a yielding force to return the draw-bar to normal position and thereby restore the driving connections to operative condition.

6. A street sweeping machine, comprising a pair of carrying wheels, a brush-carrying frame pivoted at its front end on said wheels so that its rear end shall be capable of swinging in a vertical plane, vertical bearings carried near the rear end of the frame, casters provided with vertical stems susceptible of swivel and sliding movements in said bearings, a cross rod bearing a journaled relation to the frame, arms projecting from the cross rod and fulcrumed on the caster stems, and means for rocking said cross rod to raise or lower the rear end of said frame.

7. A street sweeping machine, comprising a pair of carrying wheels, a brush-carrying frame pivoted at its front end on said wheels so that its rear end shall be capable of swinging in a vertical plane, vertical bearings carried near the rear end of the frame, casters provided with vertical stems susceptible of swivel and sliding movement in said bearings, a cross rod bearing a journaled relation to the frame, arms projecting from the cross rod and fulcrumed on the caster stems, a cart, a draw-bar arranged for substantially horizontal movement, and connected to the cart so as to turn to the left when the latter turns in the same direction, and connections between said pivoted draw-bar and said cross rod whereby the latter is operated and the rear end of the frame elevated as the cart turns to the left.

8. A street sweeping machine, comprising a pair of carrying wheels, a frame pivoted at its front end on said wheels so that its rear end shall be capable of swinging in a vertical plane, vertical bearings carried near the rear end of the frame, casters provided with vertical stems susceptible of swivel and sliding movements in said bearings, a cross rod bearing a journaled relation to the frame, arms projecting from the cross rod and fulcrumed on the caster stems, an upwardly and forwardly inclined elevator carried by the frame provided at its front end with a spout to discharge into a cart, a rotary brush behind the frame and elevator and adapted to sweep the street and force the sweepings upon the elevator, swing arms capable of movement in a vertical plane forming a journal for said brush and pivotally supported at their front ends from said frame, means carried by said frame for limiting downward movement of said arms, and for raising the same when the frame is raised, and means for operating said cross rod and raising the rear end of said frame.

9. A street sweeping machine, comprising a pair of carrying wheels, a frame pivoted at its front end on said wheels so that its rear end shall be capable of swinging in a vertical plane, vertical bearings carried near the rear end of the frame, casters provided with vertical stems susceptible of swivel and sliding movements in said bearings, a cross rod bearing a journaled relation to the frame, arms projecting from the cross rod and fulcrumed on the casters, an upwardly and forwardly inclined elevator carried by the frame and provided at its front end with a spout to discharge into a cart, a rotary brush behind the frame and elevator and adapted to sweep the street and force the sweepings upon the elevator, swing arms capable of movement in a vertical plane forming a journal for said brush and pivotally supported at their front ends from said frame, means carried by said frame for limiting downward movement of said arms, and for raising the same when the frame is raised, means for transmitting power from the carrying wheels to the rotary brush and the elevator, a laterally movable draw-bar suitably pivoted to the said frame, a cart, detachably connected to the front end of the draw-bar and adapted in turning to the left to turn the front end of the draw-bar in the same direction, and connections between the draw-bar and the cross rod whereby the latter is operated as the cart turns to the left to raise the rear end of the frame and said brush.

10. A street sweeping machine, comprising a pair of carrying wheels, a frame pivoted at its front end on said wheels so that its rear end shall be capable of swinging in a vertical plane, casters supporting the rear end of the frame, wheels bearing a journaled relation to the carrying wheels and provided with clutch members to compel the last-named wheels to rotate with the carrying wheels, a draw-bar pivoted to said frame between the slidable clutch members to move the latter out of engagement with the other clutch members when the front end of the draw bar moves to the left and into engagement when such movement of the draw-bar is reversed, swing arms pivoted at their front ends to said frame, a rotary brush journaled in said arms rearward of said frame, means carried by said frame to limit downward movement of said arms and brush independently of the frame, an inclined elevator carried by said frame, embodying an endless carrier, and gearing connecting the endless carrier and the rotary brush with the said wheels provided with clutch members.

In testimony whereof I affix my signature in the presence of two witnesses.

MILLARD G. MITCHELL.

Witnesses:
  HELEN C. RODGERS,
  G. Y. THORPE.

Copies of this patent may be obtained for five cents each, by addressing the "Commissioner of Patents, Washington, D. C."